US012001221B2

(12) United States Patent
Chowdhary et al.

(10) Patent No.: US 12,001,221 B2
(45) Date of Patent: Jun. 4, 2024

(54) METHODS FOR MANAGING COORDINATED AUTONOMOUS TEAMS OF UNDER-CANOPY ROBOTIC SYSTEMS FOR AN AGRICULTURAL FIELD AND DEVICES

(71) Applicant: EarthSense, Inc., Champaign, IL (US)

(72) Inventors: Girish Chowdhary, Champaign, IL (US); Chinmay Soman, Urbana, IL (US); Michael Hansen, Champaign, IL (US); Joseph Byrnes, Champaign, IL (US)

(73) Assignee: EARTHSENSE, INC., Champaign, IL (US)

( * ) Notice: Subject to any disclaimer, the term of this patent is extended or adjusted under 35 U.S.C. 154(b) by 282 days.

(21) Appl. No.: 17/219,471

(22) Filed: Mar. 31, 2021

(65) Prior Publication Data

US 2022/0317702 A1  Oct. 6, 2022

(51) Int. Cl.
*G05D 1/00* (2006.01)
*A01B 69/00* (2006.01)
(Continued)

(52) U.S. Cl.
CPC ......... *G05D 1/0287* (2013.01); *A01B 69/001* (2013.01); *A01B 69/008* (2013.01);
(Continued)

(58) Field of Classification Search
CPC . G01C 21/3885; A01B 69/001; A01B 69/008; A01B 79/02; A01B 79/00;
(Continued)

(56) References Cited

U.S. PATENT DOCUMENTS 6,122,572 A * 9/2000 Yavnai ................. G05D 1/0088
342/16
8,504,234 B2   8/2013 Anderson
(Continued)

FOREIGN PATENT DOCUMENTS

AU    2016269849 B2    12/2016
AU    2018204155 A1    1/2019
(Continued)

OTHER PUBLICATIONS

Translation of CN-109191321-A retrieved from Espacenet on Aug. 1, 2023 (Year: 2023).*

(Continued)

*Primary Examiner* — Fadey S. Jabr
*Assistant Examiner* — Faris Asim Shaikh
(74) *Attorney, Agent, or Firm* — Shumaker, Loop & Kendrick, LLP

(57) ABSTRACT

A method, system and non-transitory computer readable medium includes obtaining an electronic map of an agricultural field. One or more assignment instructions for each of a plurality of robotic systems in an assigned team are generated to optimize execution of a selected agricultural task with respect to at least one parameter based on the obtained electronic map, a number of the robotic systems in the team, and at least one capability of each of the robotic systems in the team. The robotic systems in the team are managed based on wireless transmission of the generated assignment instructions to the robotic systems.

21 Claims, 8 Drawing Sheets

(51) Int. Cl.
| | |
|---|---|
| A01B 69/04 | (2006.01) |
| A01C 7/00 | (2006.01) |
| A01M 7/00 | (2006.01) |
| A01M 21/00 | (2006.01) |
| G01C 21/00 | (2006.01) |
| G01S 17/89 | (2020.01) |
| G06N 20/00 | (2019.01) |
| G06Q 50/02 | (2012.01) |
| H04W 4/024 | (2018.01) |
| H04W 4/20 | (2018.01) |

(52) U.S. Cl.
CPC ............ *A01C 7/00* (2013.01); *A01M 7/0089* (2013.01); *A01M 21/00* (2013.01); *G01C 21/3885* (2020.08); *G01S 17/89* (2013.01); *G05D 1/0088* (2013.01); *G05D 1/0212* (2013.01); *G06Q 50/02* (2013.01); *H04W 4/024* (2018.02); *H04W 4/20* (2013.01); *G06N 20/00* (2019.01)

(58) Field of Classification Search
CPC ......... A01B 69/007; A01C 7/00; A01C 21/00; A01M 7/0089; A01M 21/00; G05D 1/0287; G05D 1/0088; G05D 1/0212; G05D 2201/0201; G05D 1/101; G05D 1/0293; G05D 1/0808; G05D 1/0202; G05D 1/0206; G05D 1/021; G05D 2201/021; G05D 2201/0208; G05D 2201/0213; G01S 17/88; G01S 17/89; H04W 4/024; H04W 4/20; H04W 4/46; H04W 4/44; G05B 2219/31337; G05B 2219/32371; G06N 20/00; G06Q 50/02; B60W 50/0205; G07C 5/0808; G07C 5/008; A01D 34/006; A01D 34/008; A01D 69/02; A01D 45/00; Y02A 40/10; G08G 1/22; G08G 5/0039; G08G 5/0069; B64C 39/024; B64C 13/18; B64U 10/17; B64U 10/10; B64U 10/25; B64U 2201/20
See application file for complete search history.

(56) References Cited

U.S. PATENT DOCUMENTS

| | | | |
|---|---|---|---|
| 9,288,938 | B2 | 3/2016 | Cavender-Bares et al. |
| 9,392,743 | B2 | 7/2016 | Camacho-Cook et al. |
| 10,123,473 | B2 | 11/2018 | Cavender-Bares et al. |
| 10,874,044 | B2 | 12/2020 | Cavender-Bares et al. |
| 10,890,912 | B2* | 1/2021 | Cavender-Bares .... A01C 7/085 |
| 2013/0325242 | A1 | 12/2013 | Cavender-Bares et al. |
| 2014/0012732 | A1 | 1/2014 | Lindores |
| 2014/0303814 | A1* | 10/2014 | Burema ................. B64U 50/39 901/1 |
| 2015/0051779 | A1 | 2/2015 | Camacho-Cook et al. |
| 2016/0157414 | A1 | 6/2016 | Ackerman et al. |
| 2017/0223947 | A1 | 8/2017 | Gall et al. |
| 2017/0316692 | A1* | 11/2017 | Rusciolelli ............. G08G 1/166 |
| 2017/0325443 | A1* | 11/2017 | Crinklaw ............... A01B 79/00 |
| 2017/0336787 | A1* | 11/2017 | Pichlmaier ........... G05D 1/0214 |
| 2017/0357267 | A1* | 12/2017 | Foster ................... G05D 1/024 |
| 2019/0086924 | A1* | 3/2019 | Greenfield ......... B60W 60/0011 |
| 2019/0090472 | A1* | 3/2019 | Crinklaw ............. G05D 1/0274 |
| 2019/0274241 | A1 | 9/2019 | Tippery et al. |
| 2019/0366762 | A1 | 12/2019 | Cavender-Bares et al. |
| 2020/0029490 | A1* | 1/2020 | Bertucci .............. G05D 1/0276 |
| 2020/0410609 | A1* | 12/2020 | Bidram ............ G06Q 10/06393 |
| 2021/0004017 | A1* | 1/2021 | Colgate .................. G01C 21/30 |
| 2021/0053229 | A1* | 2/2021 | Yuan ...................... B25J 11/008 |
| 2021/0158041 | A1* | 5/2021 | Chowdhary ......... G05D 1/0278 |
| 2021/0185942 | A1* | 6/2021 | Sibley .................. A01B 79/005 |
| 2022/0301440 | A1* | 9/2022 | Reagan ................ G08G 5/0052 |

FOREIGN PATENT DOCUMENTS

| | | | | |
|---|---|---|---|---|
| CA | 2930849 | A1 | 5/2015 | |
| CN | 102428770 | A | 5/2012 | |
| CN | 109191321 | A * | 1/2019 | |
| CN | 110597279 | A * | 12/2019 | ............ G05D 1/101 |
| WO | 2017219072 | A1 | 12/2017 | |
| WO | 2018136875 | A1 | 7/2018 | |
| WO | 2019040866 | A2 | 2/2019 | |

OTHER PUBLICATIONS

Translation of CN-110597279-A retrieved from Espacenet on Aug. 1, 2023 (Year: 2023).*

Hamid El Amri, et al, Emergence and reemergence of viral zoonotic diseases: Concepts and factors of emerging and reemerging globalization of health threats, Emerging and Reemerging Viral Pathogens, Sep. 17, 2019, pp. 619-634, vol. 1, Elsevier, Amsterdam Netherlands.

Victor Neira, et al, Characterization of viral load, viability and persistence of influenza a virus in air and on surfaces of swine production facilities, Jan. 16, 2016, PLOS One, San Francisco, United States of America.

Courtney Brown. Emerging zoonoses and pathogens of public health significance—an overview, Revue scientifique et technique—office international des epizooties, Aug. 1, 2004, pp. 435-442, vol. 23(2), Paris, France.

Thomas R Freiden, et al. Ebola 2014—new challenges, new global response and responsibility. New England Journal of Medicine, Sep. 25, 2014, pp. 1177-1180, Massachusetts Medical Society vol. 371(13), Waltham, United States of America.

Raoul J De Groot, et al, Commentary: Middle east respiratory syndrome coronavirus (mers-cov): announcement of the coronavirus study group. Journal of virology, Jul. 2013 pp. 7790-7792, vol. 87(14), American Society of Microbiology, Washington DC, United States of America.

Erkan Kayacan, et al, Embedded high precision control and corn stand counting algorithms for an ultra-compact 3d printed field robot, Proceedings of Robotics: Science and Systems, Pittsburgh, Pennsylvania, 2018.

Erkan Kayacan, et al, A self-learning disturbance observer for nonlinear systems in feedback—error learning scheme. Engineering Applications of Artificial Intelligence, Mar. 27, 2021, arXiv, Ithaca, New York, United States of America.

C David Lytle, et al, Predicted inactivation of viruses of relevance to biodefense by solar radiation, Journal of virology, Nov. 15, 2005 pp. 14244-14252 vol. 79(22), American Society of Microbiology, Washington DC, United States of America.

Anwesa Choudhuri, et al., Crop Stem Width Estimation in Highly Cluttered Field Environment, Computer vision problems in plant Phenotyping, Sep. 6, 2018, Submission 16, British Machine Vision Conference, Newcastle upon Tyne, United Kingdom.

Erkan Kayacan, et al., High-precision control of tracked field robots in the presence of unknown traction coefficients, Journal of Field Robotics, pp. 1050-1062, vol. 35(7), Wiley, hoboken, United States of America.

* cited by examiner

METHODS FOR MANAGING COORDINATED AUTONOMOUS TEAMS OF UNDER-CANOPY ROBOTIC SYSTEMS FOR AN AGRICULTURAL FIELD AND DEVICES

FIELD

This technology relates to robotic systems and methods that manage coordinated autonomous teams of under-canopy robotic systems for an agricultural field.

BACKGROUND

In farming, the cost of labor has been consistently decreasing, while the cost of intermediate goods (also known as inputs) and the cost of capital, which includes cost of farming equipment, has been steadily increasing and is now one of the key costs of farming. This growing cost of managing crops is a result of agriculture that is optimized to work with large machines that rely on brute force and chemicals to manage crops. Per acre profits, especially in commodity crops, are small enough that only large farm sizes can enable the grower to remain profitable. In addition, since labor is expensive, large farms are only feasible with large equipment that simplify and to some degree automate the management practices.

For example, large boom based sprayers are designed to spray large amounts of herbicide across the entire field. Compared to hand weeding or mechanical weeding, this is a simpler and more labor optimized approach because the cost of labor is equitable to the total time it takes to cover the field while the operator is in a (semi-automated) boom sprayer.

Similarly, there has been significant optimization of cropping practices, both in specialty and commodity crops, to maximize efficiency of large agricultural equipment. In all cases, the dominant trend is to rely on using chemicals to combat agricultural "stressors", such as weeds, diseases, fungi, and nutrient deficiency (inclusive of Nitrogen, Phosphorous, Potassium etc.). These chemicals are delivered using large agricultural equipment.

These prior agricultural methods relying on chemicals sprayed with large equipment are not sustainable and are already leading to several ill effects. The underlying labor shortage also is preventing the adoption of sustainable agricultural practices that are more labor intensive. Indeed, excessive use of herbicides coupled with planting of resistant cultivars is a primary reason behind the proliferation of herbicide resistant weeds in corn and soybean crops in the Midwest, while excessive use of nitrogen, herbicides, and insecticides is linked with the potential harm of chemical runoff into US waterways. Nutrient runoff into waterways is another critical problem that has resulted from excessive use of Nitrogen in farming watersheds.

Larger equipment is also expensive to manufacture due to the complexities of the equipment and expensive to operate due to fuel requirements. It also causes soil compaction and is not able to be deployed easily later into the season due to potential damage to the crop. This limits the kinds of efficient and sustainable agricultural practices that can be employed today. For example, cover crops can help reduce the Nitrogen necessary for farming and suppress weeds, however planting of cover crops is not practiced today. One reason for this being that it is hard to plant cover crops early enough in the season with large equipment.

Attempts have been made to automate aspects of these farming processes through the use of individual robotic systems. Although these individual robotic systems have a smaller footprint and show promise, these prior approaches have been focused on the particular individual capabilities of each robot.

SUMMARY

A method includes obtaining, by a computing device, an electronic map of an agricultural field. One or more assignment instructions for each of a plurality of robotic systems in an assigned team are generated, by the computing device, to optimize execution of a selected agricultural task with respect to at least one parameter based on the obtained electronic map, a number of the robotic systems in the team, and at least one capability of each of the robotic systems in the team. The robotic systems in the team are managed, by the computing system, based on wireless transmission of the generated assignment instructions to the robotic systems.

An agricultural management system includes a memory comprising programmed instructions stored thereon and one or more processors configured to be capable of executing the stored programmed instructions to obtain an electronic map of an agricultural field. One or more assignment instructions for each of a plurality of robotic systems in an assigned team are generated, by the computing device, to optimize execution of a selected agricultural task with respect to at least one parameter based on the obtained electronic map, a number of the robotic systems in the team, and at least one capability of each of the robotic systems in the team. The robotic systems in the team are managed, by the computing system, based on wireless transmission of the generated assignment instructions to the robotic systems.

A non-transitory computer readable medium having stored thereon instructions comprising executable code which when executed by one or more processors, causes the one or more processors to obtain an electronic map of an agricultural field. One or more assignment instructions for each of a plurality of robotic systems in an assigned team are generated, by the computing device, to optimize execution of a selected agricultural task with respect to at least one parameter based on the obtained electronic map, a number of the robotic systems in the team, and at least one capability of each of the robotic systems in the team. The robotic systems in the team are managed, by the computing system, based on wireless transmission of the generated assignment instructions to the robotic systems.

This technology provides a number of advantages including providing an interactive team of robotic systems and methods to more effectively accomplish one or more agricultural management tasks in an agricultural field. This type of coordinated team-based approach with the robotic systems provides significant flexibility in scaling up or down according to agricultural field size enabling much more efficient execution of specific tasks and "scale-neutral" agriculture which is not possible with a single large equipment due to their large cost. Examples of this technology are able to use data from one or more robotic systems in a team to improve navigation for other ones of the robotic system in the team. Additionally, with examples of this technology from one or more robotic systems in a team can advantageously learn about executing one or more agricultural management tasks from other ones of the robotic system in the team.

DETAILED DESCRIPTION

An exemplary agricultural management system 10 is shown in FIGS. 1-3B. In this example, the agricultural management system 10 includes a team of robotic systems 12(1)-12(n) and at least one edge or base station 14 which may be coupled to a supporting cloud computing system 19, although the system may comprise other types and/or numbers of other systems, devices, components, and/or other elements in other configurations. This technology provides a number of advantages including providing systems, methods, and non-transitory computer readable media that effectively and efficiently manage coordinated autonomous teams of under-canopy robotic systems to accomplish one or more agricultural management tasks in an agricultural field.

Figure 1:
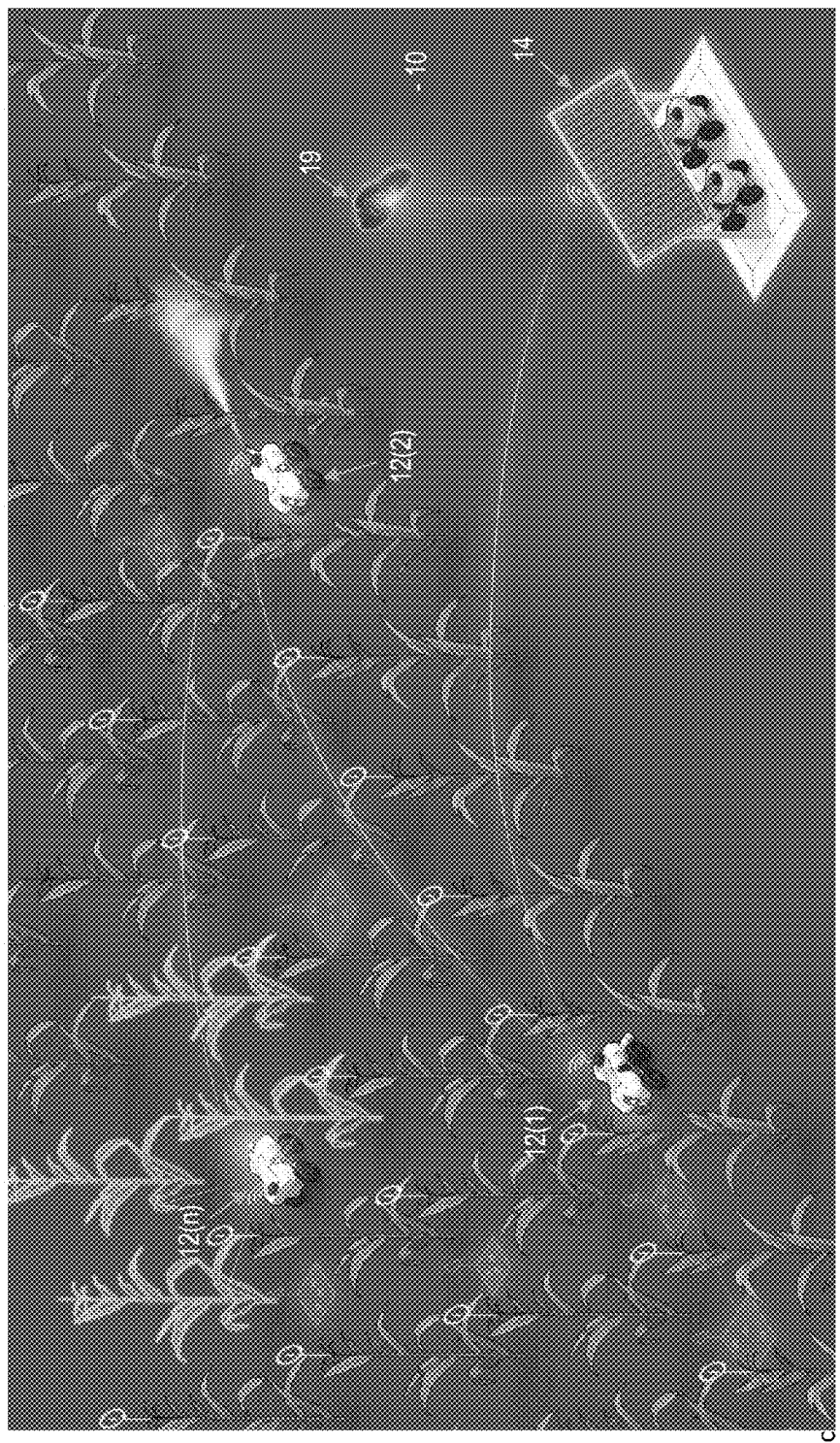
FIG. 1 is a perspective view of an example of an agricultural management system comprising agricultural robotic systems and an edge or base station.
Figure 2B:
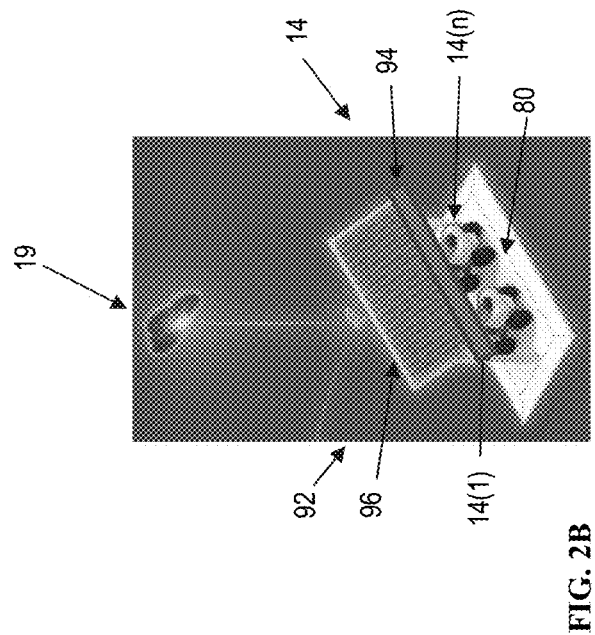
FIG. 2B is perspective view of an example of the edge or base station shown in FIG. 1.
Figure 2A:
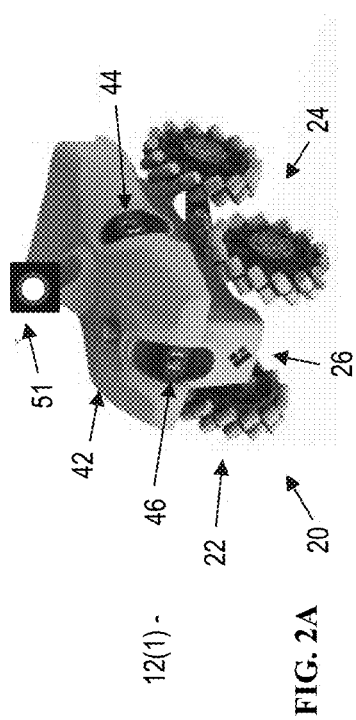
FIG. 2A is a perspective view of an example of one of the agricultural robotic systems shown in FIG. 1.
Figure 3A:
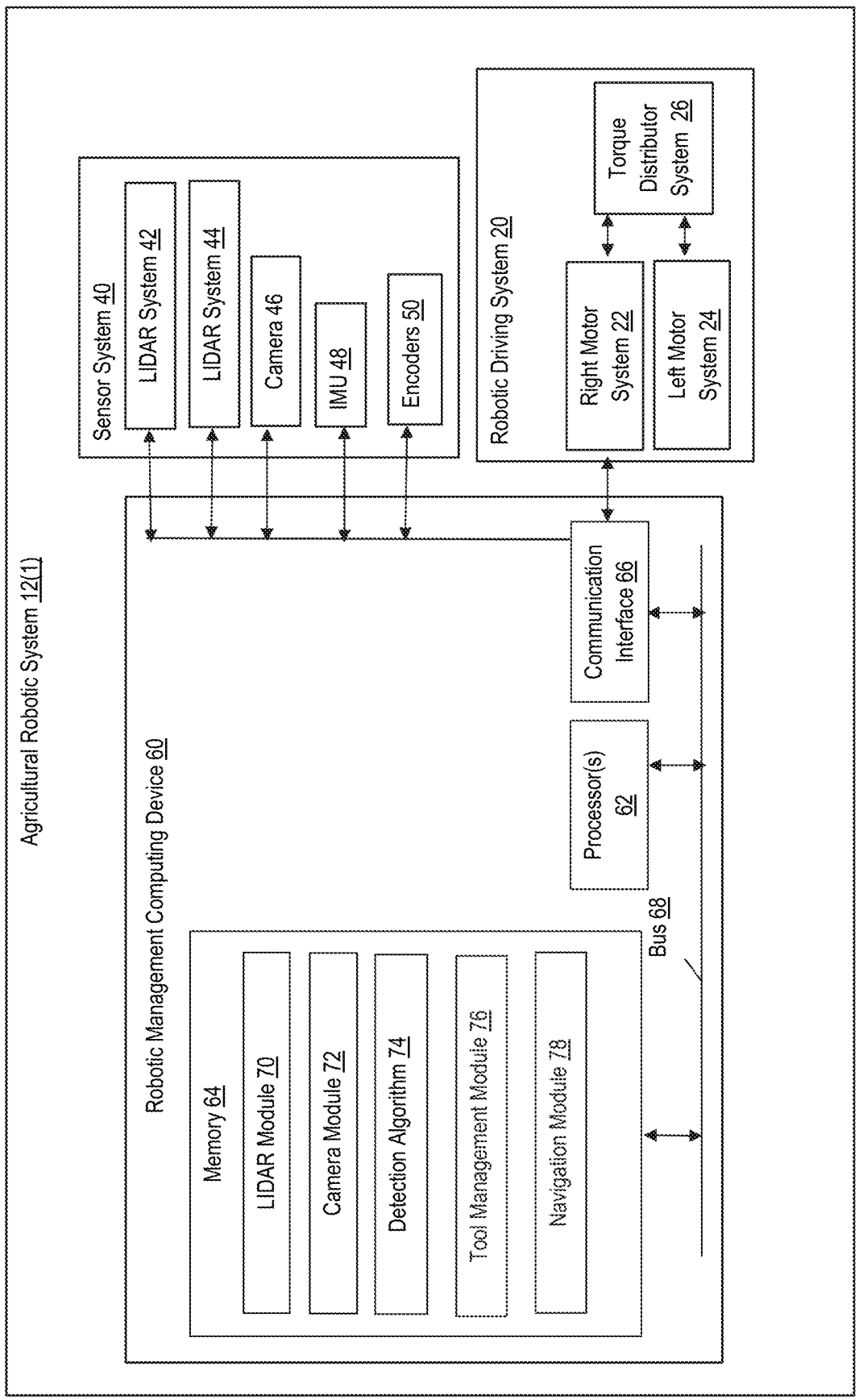
FIG. 3A is a block diagram of the example of one of the agricultural robotic systems shown in FIG. 1.
Figure 3B:
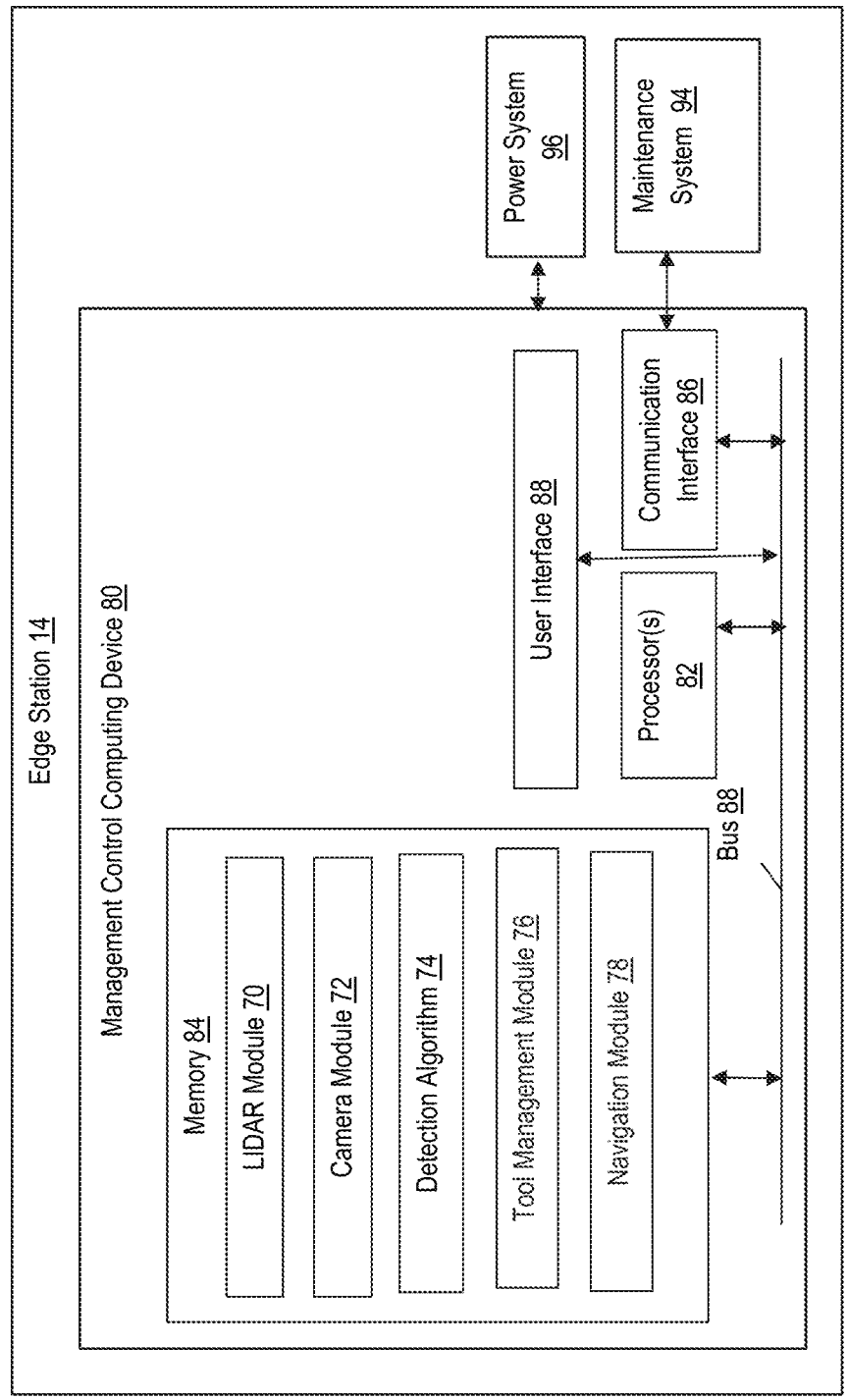
FIG. 3B is a block diagram of the example of the edge or base station shown in FIG. 1.

Referring more specifically to FIGS. 1, 2A and 3A, the system 10 includes a team of robotic systems 12(1)-12(n) which can be coordinated by the edge station 14, for example, to accomplish one or more agricultural tasks in a cost and time efficient manner reliably in agricultural fields, including planting of crops, planting of cover-crops, mechanical weeding, spraying of agricultural chemicals, and/or harvesting of produce or fruit by way of example only. Each of the robotic systems 12(1)-12(n) comprises a small fully automated and self-propelled motor vehicle with multiple sensors and/or tools to accomplish one or more agricultural tasks in an agricultural field.

In this example, the robotic system 12(1) includes a robotic driving system 20, a sensor and tool system 40, and a robotic management computing device 60, although the robotic system 12(1) could comprise other types and/or numbers of other systems, devices, components or other elements in other configurations. For ease of illustration, only one of the robotic systems 12(1) is illustrated and described in greater detail in FIGS. 2A and 3A, although in this example the other robotic systems 12(2)-12(n) have the same structure and operation. In other examples, one or more of the robotic systems 12(1)-12(n) could have other types and/or numbers of systems, devices, components and/or other elements and/or be configured in other manners for one or more other operations.

In this example, the robotic driving system 20 is used to drive the robotic system 12(1) in the agricultural field, although other types of systems to enable movement of the robotic system 12(1) may be used. In this example, the robotic driving system 20 includes all of the parts of a motor vehicle system including, by way of example, a body, engine, fuel system, steering system, brake system, powertrain, and wheels. Additionally, in this example, the robotic driving system 20 has right and left motor systems 22 and 24 which are coupled to a torque distributor system 26 that is driven by powertrain powered by a motor coupled to a fuel source, such as a battery by way of example, and whose operation is managed by a motor controller, such as robotic management computing device 60 by way of example only, although other types and/or numbers of systems, devices, components and/or other elements to enable automated guided motorized movement of the robotic system 12(1) in the agricultural field may be used. By way of example only, an exemplary robotic driving system or vehicle which could be used is illustrated and described by way of example in WO 2019/040866, which is herein incorporated by reference in its entirety.

The robotic driving system 20 also may use an omnidirectional drive system, such as a Mecanum drive system with Mecanum wheels by way of example, which is able to move in any direction without the need to change orientation before or while moving, although other types of drive systems may be used. Accordingly, in this example the Mecanum drive system shortens the time required for the robotic driving system 20 to react in the agricultural field which is advantageous. Additionally, and by way of example only, the robotic system 12(1) with this robotic driving system 20 may have a length of about 21.5 inches and a width of about 12 inches to minimize the overall footprint and further enhance maneuverability of the robotic system 12(1) in the agricultural field in the rows and beneath the canopy, although the robotic system 12(1) could have other dimensions depending on the particular agricultural field.

To enhance balance, the robotic driving system 20 in the robotic system 12(1) may arrange components of the motor system which are heavier towards the bottom of a housing for the robotic driving system 20, such as the battery or other power or fuel source by way of example. The robotic driving system 20 may also comprise or otherwise house or support other types and/or numbers of other systems, devices, components, and/or other elements in other configurations.

Additionally in this example, the sensor and tool system 40 for the robotic system 12(1) comprises light detection and ranging (LIDAR) systems 42-44, a camera 46, an inertial measurement unit (IMU) 48, encoders 50, and at least one automated agricultural tool 51, such as a sprayer, weeding system, or planter by way of example only, which may be housed in and/or on the robotic driving system 20, although one or more of these systems, devices, components or other elements could be at other locations in other examples and other types and/or numbers of sensors may be used. The light detection and ranging (LIDAR) systems 42-44, the camera 46, the inertial measurement unit (IMU) 48, encoders 50, and automated agricultural tool 51 are each coupled to the robotic management computing device 60, although each may have other types and/or numbers of connections to other systems, devices, components and/or other elements to enable the automated guided and targeted disinfection as illustrated and described by way of the examples herein.

In this example, the camera 46 may be a monocular camera or depth-sensing camera, such as Intel RealSense, or in other examples may comprise multiple cameras forming a stereo camera or multi-view camera module, to capture images in the agricultural fields, such as images to measure the angle and depth of an object of interest in an agricultural field, to manage navigation and/or execution of one or more agricultural tasks by way of example. Additionally, the light detection and ranging (LIDAR) systems 42-44 are each located on the housing for the robotic driving system 20, although other types and/or numbers of imaging systems may be used.

In this example, the inertial measurement unit (IMU) 48 is in the robotic driving system 20, is coupled to the robotic management computing device 60, and may measure and report data, such as a specific force, angular rate, and orientation of the robotic system 12(1) in this example using a combination of accelerometers, gyroscopes, and/or magnetometers, although other types and/or numbers of measurement devices may be used by the robotic system 12(1). Additionally, the encoders 50 are in the robotic driving system 20, are coupled to the robotic management computing device 60, and are configured convert motion of the robotic system 12(1) to an electrical signal that can be read by the robotic management computing device 60 to control motion of the robotic system 12(1). Further the automated agricultural tool 51, again such as a sprayer, weeding system, or planter by way of example only, may be on or in the robotic drive system 20 and coupled to receive control instructions for operations from the robotic management computing device 60.

Further in this example, the robotic management computing device 60 in the robotic system 12(1) is coupled to the robotic driving system 20 and the sensor and tool system 40 and may execute any number of functions and/or other operations including managing one or more aspects of one or more agricultural tasks in an agricultural field as illustrated and described by way of the examples herein. In this particular example, the robotic management computing device 60 includes one or more processor(s) 62, a memory 64, and/or a communication interface 66, which are coupled together by a bus or other communication link 68, although the robotic management computing device 60 can include other types and/or numbers of elements in other configurations.

The processor(s) 62 of the robotic management computing device 60 may execute programmed instructions stored in the memory of the robotic management computing device 60 for any number of functions and other operations as illustrated and described by way of the examples herein. The processor(s) 62 of the robotic management computing device 60 may include one or more CPUs or general purpose processors with one or more processing cores, for example, although other types of processor(s) can also be used.

The memory 64 of the robotic management computing device 60 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 64.

Accordingly, the memory 64 of the robotic management computing device 60 can store one or more applications that can include computer executable instructions that, when executed by the robotic management computing device 60, cause the robotic management computing device 60 to perform actions, such as to managing one or more aspects of one or more agricultural tasks in an agricultural field by way of example, and other actions as described and illustrated in the examples below with reference to FIGS. 1-8. The application(s) can be implemented as modules, programmed instructions or components of other applications. Further, the application(s) can be implemented as operating system extensions, module, plugins, or the like.

Even further, the application(s) may be operative in a cloud-based computing system or environment 19 coupled to each of robotic systems 12(1)-12(n). The application(s) can be executed within or as virtual machine(s) or virtual server(s) that may be managed in a cloud-based computing system or environment 19. Also, the application(s), and even the robotic management computing device 60 itself, may be located in virtual server(s) running in a cloud-based computing system or environment 19 rather than being tied to one or more specific physical computing devices in each of robotic systems 12(1)-12(n). Also, the application(s) may be running in one or more virtual machines (VMs) executing on the robotic management computing device 60. Additionally, in one or more examples of this technology, virtual machine(s) running on the robotic management computing device 60 may be managed or supervised by a hypervisor. Further in other examples, each of robotic systems 12(1)-12(n) may be coupled, e.g. by wireless communications, to one or more edge stations 14 positioned in and/or near the agricultural field. The wireless communication can be with high-bandwidth 5G or 2.4 GHz Wi-Fi, or with low bandwidth LoRA or TV Whitespace, or a combination thereof. Each of the edge stations 14 may have a management control computing device 80 which runs one or more aspects of examples of the application to manage each of robotic systems 12(1)-12(n).

In this particular example, the memory 64 of the robotic management computing device 60 may include a LIDAR module 70, a camera module 72, an object detection algorithm 74, a tool management 76, and a navigation module 78 which may be executed as illustrated and described by way of the examples herein, although the memory 64 can for example include other types and/or numbers of modules, platforms, algorithms, programmed instructions, applications, or databases for implementing examples of this technology.

The LIDAR module 70 and camera module 72 may comprise executable instructions that are configured to process imaging data captured by the LIDAR systems 42 and 44 and the camera 46 to manage operations, such as navigation and/or execution of one or more agricultural tasks by way of example, as illustrated and described in greater detail by way of the examples herein, although each of these modules may have executable instructions that are configured to execute other types and/or functions or other operations to facilitate examples of this technology.

Additionally, in this example the detection algorithm 74 may comprise executable instructions that are configured to identify objects, such as an agricultural product in a field or objects that may impact navigation in the agricultural field, in the imaging data captured by the sensor system 40, such as one or more of the LIDAR systems 42 and 44 and/or the camera 46, although this algorithm may have executable instructions that are configured to execute other types and/or functions or other operations to facilitate examples of this technology.

The tool management module 76 may comprise executable instructions that are configured to manage the agricultural tool 51 to execute one or more agricultural tasks in a cost and time efficient manner reliably in agricultural fields, such as planting of crops, planting of cover-crops, mechanical weeding, spraying of agricultural chemicals, and/or harvesting of produce or fruit by way of example only.

The navigation module 78 may comprise executable instructions that are configured to enable autonomous navigation of each of robotic systems 12(1)-12(n) without use of a global position system (GPS) and which adjust to the agricultural field as illustrated and described in greater detail by way of the examples herein, although this module may have executable instructions that are configured to execute other types and/or functions or other operations to facilitate examples of this technology. In this particular example, the navigation module 78 does not use and each of robotic systems 12(1)-12(n) does not have a global positioning system (GPS). In other examples, GPS or other systems which simulate or otherwise facilitate use of GPS could be used by the navigation module 78 to manage or assist navigation of each of robotic systems 12(1)-12(n).

The communication interface 66 of the robotic management computing device 60 operatively couples and communicates between the robotic management computing device 60 and the robotic driving system 20 and the sensor and tool system 40, which are all coupled together, although other types and/or numbers of connections and/or communication networks can be used. Additionally, the communication interface 86 of the robotic management computing device 60 in the robotic system 12(1) may comprise other elements, such as a transceiver system to couple and communicate with the management control computing device 80 of the edge station 14 in this example, although other communication systems may be used.

In this example, the edge station 14 is used to manage the robotics systems 12(1)-12(n) to accomplish one or more aspects of one or more agricultural tasks in a cost and time efficient manner reliably in agricultural fields, including planting of crops, planting of cover-crops, mechanical weeding, spraying of agricultural chemicals, and/or harvesting of produce or fruit by way of example only, although other types and/or numbers of edge or other control systems may be used. Although in this example one edge station 14 positioned on a side of an agricultural field is shown, in other examples additional numbers of edge stations may be positioned about the perimeter and/or in the agricultural field to assist with one or more aspects of one or more agricultural tasks, such as providing control instructions to one or more of the robotics systems 12(1)-12(n) and/or to recharge and refill one or more of the robotics systems 12(1)-12(n) by way of example. Additionally, in this example, the edge station 14 includes a structure 92 that may house one or more of the robotics systems 12(1)-12(n) and also includes a management control computing device 80, a maintenance system 94, and a power system 96, although the edge station 14 may have other types and/or numbers of other systems, devices, components or other elements in other configurations. Additionally, in this example, the management control computing device 80 may be coupled to a cloud computing system 19 to assist in one or more aspects of managing the robotics systems 12(1)-12(n) to accomplish one or more agricultural tasks.

In this example, the management control computing device 80 in the robotic system 12(1) is coupled to the maintenance system 94, the power system 96, and the cloud computing system 19 and may execute any number of functions and/or other operations including managing one or more aspects of one or more agricultural tasks in an agricultural field as illustrated and described by way of the examples herein. In this particular example, the management control computing device 80 includes one or more processor(s) 82, a memory 84, a communication interface 86, and/or a user interface 88 which are coupled together by a bus or other communication link 88, although the management control computing device 80 can include other types and/or numbers of elements in other configurations.

The processor(s) 82 of the management control computing device 80 may execute programmed instructions stored in the memory of the management control computing device 80 for any number of functions and other operations as illustrated and described by way of the examples herein. The processor(s) 82 of the management control computing device 80 may include one or more CPUs or general purpose processors with one or more processing cores, for example, although other types of processor(s) can also be used.

The memory 84 of the management control computing device 80 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 84.

Accordingly, the memory 84 of the management control computing device 80 can store one or more applications that can include computer executable instructions that, when executed by the management control computing device 80, cause the management control computing device 80 to perform actions, such as to managing one or more agricultural tasks in an agricultural field by way of example, and other actions as described and illustrated in the examples below with reference to FIGS. 1-8. The application(s) can be implemented as modules, programmed instructions or components of other applications. Further, the application(s) can be implemented as operating system extensions, module, plugins, or the like.

Even further, the application(s) may be operative in a cloud-based computing system or environment 19 comprising one or more physical and/or virtual cloud based computing devices or other systems coupled to each of robotic systems 12(1)-12(n) and/or the edge station(s) 14, although other examples may have connections to other types and/or numbers of other systems, devices, components or other elements in other configurations. The application(s) can be executed within or as virtual machine(s) or virtual server(s) and/or physical machine(s) or physical server(s) that may be managed in a cloud-based computing system or environment 19. Also, the application(s), and even the management control computing device 80 itself, may be located in virtual server(s) running in a cloud-based computing environment rather than being tied to one or more specific physical computing devices in each of robotic systems 12(1)-12(n). Further, the application(s) may be running in one or more virtual machines (VMs) executing on the management control computing device 80. Additionally, in one or more embodiments of this technology, virtual machine(s) running on the management control computing device 80 may be managed or supervised by a hypervisor.

In this particular example, the memory 84 of the management control computing device 80 may include the LIDAR module 70, the camera module 72, the object detection algorithm 74, the tool management 76, and the navigation module 78 which may be executed as illustrated and described earlier and by way of the examples herein, although the memory 84 can for example include other types and/or numbers of modules, platforms, algorithms, programmed instructions, applications, or databases for implementing examples of this technology.

In this example, the LIDAR module 70 and camera module 72 may comprise executable instructions that are configured to process imaging data captured by the LIDAR systems 42 and 44 and the camera 46 in one or more of the robotics systems 12(1)-12(n) to manage operations, such as navigation and/or execution of one or more agricultural tasks by way of example, as illustrated and described in greater detail by way of the examples herein, although each of these modules may have executable instructions that are configured to execute other types and/or functions or other operations to facilitate examples of this technology.

Additionally, in this example the detection algorithm 74 may comprise executable instructions that are configured to identify objects, such as an agricultural product in a field or objects that may impact navigation in the agricultural field, in the imaging data captured by the sensors, such as one or more of the LIDAR systems 42 and 44 and/or the camera 46 in one or more of the robotics systems 12(1)-12(n), although this algorithm may have executable instructions that are configured to execute other types and/or functions or other operations to facilitate examples of this technology.

The tool management module 76 may comprise executable instructions that are configured to manage the agricultural tool 51 in one or more of the robotics systems 12(1)-12(n) to execute one or more agricultural tasks in a cost and time efficient manner reliably in agricultural fields, such as planting of crops, planting of cover-crops, mechanical weeding, spraying of agricultural chemicals, and/or harvesting of produce or fruit by way of example only.

The navigation module 78 may comprise executable instructions that are configured to enable autonomous navigation of one or more of the robotic systems 12(1)-12(n) without use of a global position system (GPS) and which adjust to the agricultural field as illustrated and described in greater detail by way of the examples herein, although this module may have executable instructions that are configured to execute other types and/or functions or other operations to facilitate examples of this technology. In this particular example, the navigation module 78 does not use and each of robotic systems 12(1)-12(n) does not have a global positioning system (GPS). In other examples, GPS or other systems which simulate or otherwise facilitate use of GPS could be used by the navigation module 78 to manage or assist navigation of each of robotic systems 12(1)-12(n).

The communication interface 86 of the management control computing device 80 operatively couples and communicates between the management control computing device 80 and the maintenance system 94 and power system 96 although other types and/or numbers of connections and/or communication networks to other systems, devices, components or other elements can be used. Additionally, the communication interface 86 of the management control computing device 80 may comprise other elements, such as a transceiver system to couple and communicate with the communication interface 66 in the robotic management computing device 60 in each of the robotic systems 12(1)-12(n) in this example, although other communication systems may be used.

The user interface 88 of the management control computing device 80 may comprise one or more of a display, such as an computer monitor or touchscreen by way of example, a keyboard, and/or a computer mouse, although other types and/or numbers of user interfaces for providing a display and enabling user input may be used.

The maintenance system 94 may comprise a system to facilitate assisting the one or more robotic systems 12(1)-12(n) with one or more aspects of one or more agricultural tasks, such as providing refueling for one or more robotic systems 12(1)-12(n), refilling one or more robotic systems 12(1)-12(n) with seeds, fertilizer, and/or pesticides by way of example, to execute one or more of the agricultural tasks, and/or to provide other types and/or numbers of maintenance operations.

The power system 96 in this example is a solar power system which may be used to capture and convert sunlight to power one or more robotic systems 12(1)-12(n) and/or the edge station 14, although other types and/or numbers of power systems may be used.

In this example, the cloud computing system 19 is used to manage the edge station 14 and/or the robotics systems 12(1)-12(n) to accomplish one or more aspects of one or more agricultural tasks in a cost and time efficient manner reliably in agricultural fields, including planting of crops, planting of cover-crops, mechanical weeding, spraying of agricultural chemicals, and/or harvesting of produce or fruit by way of example only, although other types and/or numbers of edge or other control systems may be used. Although in this example the cloud computing system 19 is shown coupled to the edge station 14, in other examples the cloud computing system 19 may be coupled directly to manage the robotics systems 12(1)-12(n). Further in this example the cloud computing system 19 may comprise one or more physical and/or virtual server or other computing devices configured to execute one or more aspects of this technology as illustrated and described herein, such as the operations illustrated and described with respect to the edge station 14 and robotics systems 12(1)-12(n) in the examples herein.

While the robotic management computing device 60 in each of the robotic systems 12(1)-12(n) and the management control computing device 80 in the edge station 14 are each illustrated in this example as including a single device, one or more of the robotic management computing devices 60 and the management control computing device 80 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in one or more of the robotic management computing devices 60 and/or the management control computing device 80.

Additionally, one or more of the devices that together comprise the one or more of the robotic management computing devices 60 and/or the management control computing device 80 in other examples can be standalone devices or integrated with one or more other devices or apparatuses, such as in one of the server devices or in one or more computing devices for example. Moreover, one or more of the devices of one or more of the robotic management computing devices 60 and/or the management control computing device 80 in these examples can be in a same or a different communication network including one or more public, private, or cloud networks, for example.

Although exemplary robotic management computing devices 60 and a management control computing device 80 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in this agricultural management system 10, such as one or more of the robotic management computing devices 60 and/or the management control computing device 80, for example, may be configured to operate as virtual instances on the same physical machine. In other words, by way of example one or more of the management control computing device 80 may operate on the same physical device rather than as separate devices communicating through communication network(s). Additionally, there may be more or fewer of the robotic management computing devices 60 and/or the management control computing devices 80 than illustrated in FIGS. 3A and 3B.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Exemplary methods for managing one or more agricultural tasks in an agricultural field with a team of robotic systems 12(1)-12(n) and an edge station 14 will now be described with reference to FIGS. 1-8. In these examples, the robotic systems 12(1)-12(n) are connected to each other and to a computing node or edge station 14 of the field and/or to the cloud computing system 19 and enjoy a hierarchic command and control methodology, although other types of management configurations may be used.

Figure 4:
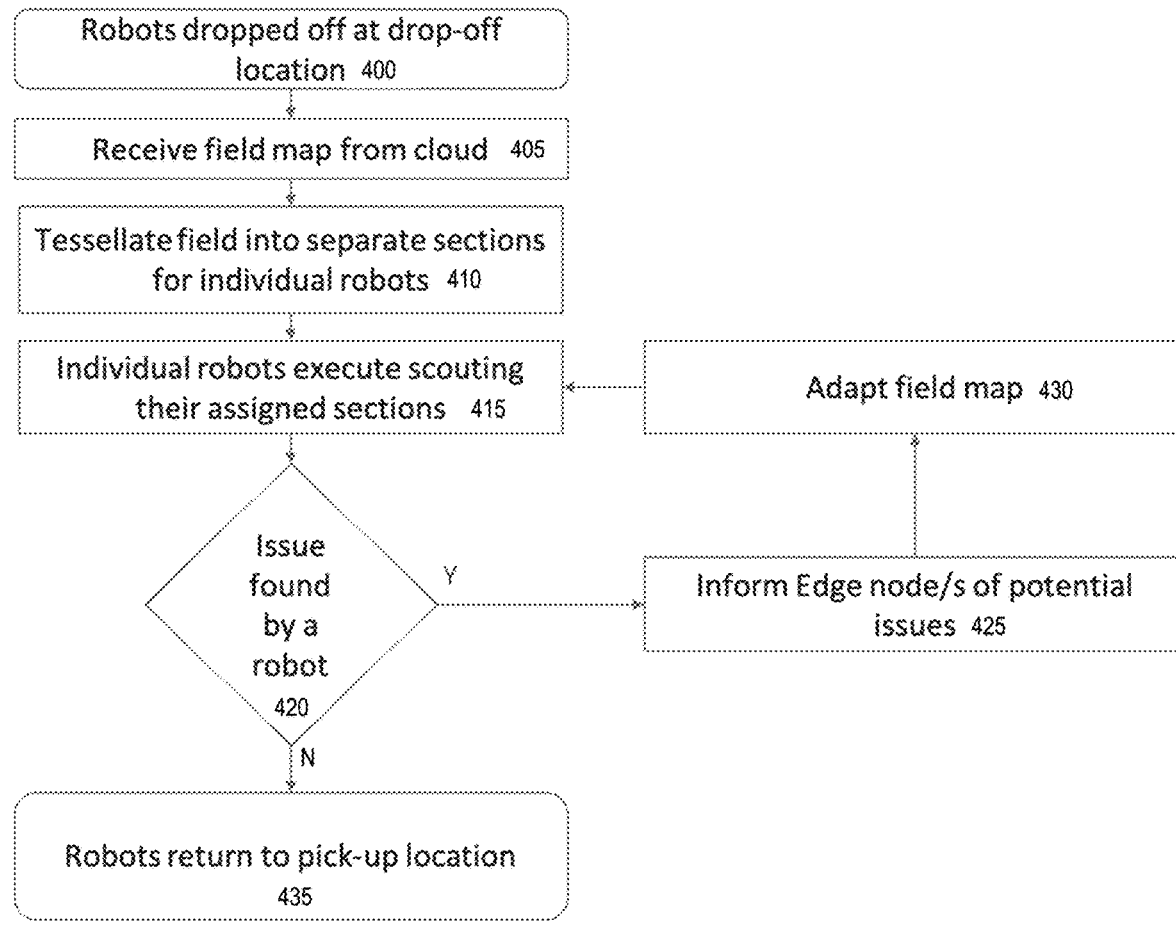
FIG. 4 is a flowchart of an example of a method for managing a coordinated autonomous teams of under-canopy robotic systems for drop off scouting of an agricultural field.

Referring to FIG. 4, an example of a method for managing a coordinated autonomous teams of under-canopy robotic systems for drop-off scouting of an agricultural field is illustrated. In this example, in step 400 a team of robotic systems 12(1)-12(n) may be delivered to the agricultural field to perform the drop-off scouting, although as illustrated and described by way of the other examples herein other types and/or numbers of agricultural tasks can be completed. Additionally, in this example, each of the steps is managed by the management control computing device 80 at the edge station 14, although in other examples one or more of these steps may be managed by one or more of the robotic management computing devices 60 in the team of robotic systems 12(1)-12(n) and/or the cloud computing system 19.

In step 405, the management control computing device 80 at the edge station 14 may receive or otherwise search for and obtain an electronic field map of the agricultural field on which the drop-off scouting is to be executed from the cloud computing system 19, although the electronic field map can be obtained from other sources and in other manners.

In step 410, the management control computing device 80 at the edge station 14 may tessellate the electronic field map of the agricultural field for drop-off scouting based on one or more factors, such as one or more characteristics about the agricultural field, such as a size, shape and/or condition of the agricultural field, one or more aspects about the robotic systems 12(1)-12(n), such as an available number, an available performance range, or types and/or capabilities of available tool(s) 51 on each of the robotic systems 12(1)-12(n), and one or more task performance parameters, such as a completion time limit threshold, a cost threshold, and/or designated completion objective related to the agricultural task, like completing a certain percentage of seeding or weeding, by way of example only. By way of example, when tessellating the electronic field map of the agricultural field for drop-off scouting, the management control computing device 80 at the edge station 14 may determine to allocate a certain number of the robotic systems 12(1)-12(n) with the same types of sensors to ensure quicker coverage to meet a time limit threshold or a certain number of robotic systems 12(1)-12(n) with the different types of sensors as the tools 51 controlled to position the sensors to ensure an overlap of the imaged areas to collect multi-modal datasets. In other examples, the robotics systems 12(1)-12(n) may be directed to navigate in a manner so that the imaging sensors, such as LIDAR systems 42-44 and/or camera(s) overlap to provide enhanced detail to identify aspects and/or issues to facilitate generation of navigation and other control instructions for the robotic systems 12(1)-12(n) to effectively complete the agricultural task(s) in a manner that satisfies one or more set or otherwise stored parameters or other goals.

In step 415, the management control computing device 80 at the edge station 14 may transmit navigation instructions to the robotic management computing device 60 in each of the robotic systems 12(1)-12(n) to manage the scouting based on the tessellation of the electronic field map. In this example, each of the robotic management computing device 60 in each of the robotic systems 12(1)-12(n) may begin the execution of the navigation instructions and may transmit back captured scouting data, such as images from one or more of the LIDAR systems 42 and/or 44 and camera 46 as well as sensor data from the IMU 48 and encoders 50 to the management control computing device 80 at the edge station 14 to provide the updated scouting data and/or to dynamically adjust the navigation instructions based on identified condition(s) in the agricultural field, although the scouting data may be transmitted to other locations, such as the cloud computing system 19, and may be used for other purposes. Further, in other examples of this technology the robotic systems 12(1)-12(n) may autonomously navigate based on this obtained tessellated electronic map received from the management control computing device 80 at the edge station 14 and fused imaging data obtained from two or more LIDAR systems 42-44 or camera(s) 46 during navigation for the selected agricultural task.

In step 420, in this example the robotic management computing device 60 in one or more or each of the robotic systems 12(1)-12(n) may monitor to determine if any issue is identified during the scouting, such as an issue with one or more of the LIDAR systems 42 and 44 or the camera 46, an issue with the robotic driving system 20, or other error indication from one of the robotic systems 12(1)-12(n) by way of example, although other manners for identifying an issue may be used. By way of example, the management control computing device 80 at the edge station 14 may determine if any of the robotic systems 12(1)-12(n) encounter any issues in the robotic systems 12(1)-12(n) or with navigation in the agricultural field during the drop-off scouting. By way of another example, the management control computing device 80 at the edge station 14 may monitor each of the robotic systems 12(1)-12(n) to identify an issue with the progress of one or more of the robotic systems 12(1)-12(n) in obtaining and/or providing scouting data and/or an operational error indication or condition with one of the robotic systems 12(1)-12(n).

In this example, if in step 420 the robotic management computing device 60 in one or more of the robotic systems 12(1)-12(n) determines an issue is identified during the scouting, then the Yes branch is taken to step 425. In step 425, in this example the management control computing device 80 at the edge station 14 may receive a transmission regarding the identified issue from the robotic management computing device 60 in one or more of the robotic systems 12(1)-12(n) which identified the issue.

In step 430, the management control computing device 80 at the edge station 14 may adjust or provide an updated designation in the electronic field map when the identified issue relates to one or more parts of the agricultural field, such as a condition of the agricultural field or a new obstacle in the agricultural field by way of example only. In other examples, when the identified issue relates to one or more of the robotic systems 12(1)-12(n), then one or more of the robotic systems 12(1)-12(n), the edge station 14, and/or the cloud computing system 19 may dynamically reconfigure the navigation and other control instructions to each of the other robotic systems 12(1)-12(n) to complete the agricultural task in a manner that still satisfies the one or more the task performance parameters. In yet other examples, when the identified issue would prohibit satisfaction of one or more the task performance parameters, then then the one or more of the robotic systems 12(1)-12(n), the edge station 14, and/or the cloud computing system 19 may dynamically reconfigure the navigation and other control instructions to each of the other robotic systems 12(1)-12(n) to complete the agricultural task in a manner determined to satisfy a highest number of the other task performance parameters.

If back in step 420, in this example the robotic management computing device 60 in one or more of the robotic systems 12(1)-12(n) determines an issue is not identified during the drop-off scouting, then the drop-off scouting continues until completion and then the No branch is taken to step 435.

In step 435, the scouting data from the robotic management computing device 60 in each of the robotic systems 12(1)-12(n) is transmitted to the management control computing device 80 at the edge station 14 and/or to the cloud computing system 19 for processing and/or storage to update the scouting of the electronic field map for the agricultural field. Meanwhile the team of the robotic systems 12(1)-12(n) used for the drop-off scouting may be moved to a storage area, moved to another agricultural, or reconfigured to perform a different agricultural task.

Figure 5:
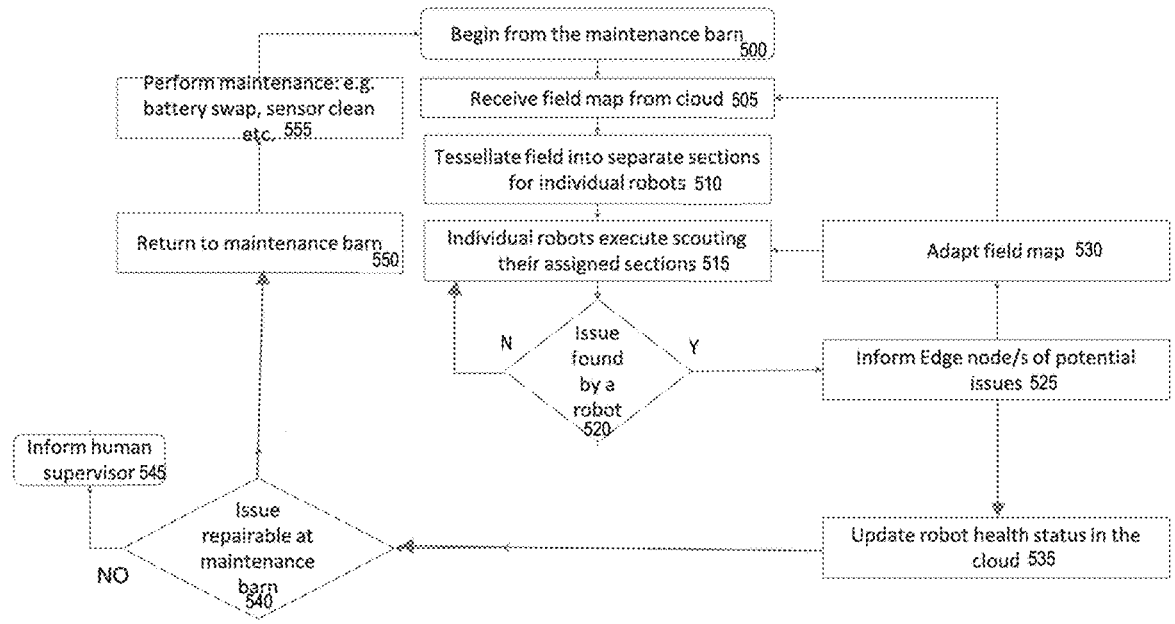
FIG. 5 is a flowchart of an example of a method for managing a coordinated autonomous teams of under-canopy robotic systems for persistent scouting of an agricultural field.

Referring to FIG. 5, an example of a method for managing a coordinated autonomous teams of under-canopy robotic systems to perform persistent scouting of an agricultural field is illustrated. In this example, in step 500 a team of robotic systems 12(1)-12(n) stationed at or adjacent to the agricultural field in a storage barn or other storage location may be engaged to perform persistent scouting, although as illustrated and described by way of the other examples herein other types and/or numbers of agricultural tasks can be completed. Additionally, in this example, each of the steps is managed by the management control computing device 80 at the edge station 14, although in other examples one or more of these steps may be managed by one or more of the robotic management computing devices 60 in the team of robotic systems 12(1)-12(n) and/or the cloud computing system 19.

In step 505, the management control computing device 80 at the edge station 14 may receive or otherwise search for and obtain an electronic field map of the agricultural field from the cloud computing system 19, although the electronic field map can be obtained from other sources and in other manners.

In step 510, the management control computing device 80 at the edge station 14 may tessellate the electronic field map of the agricultural field for persistent scouting based on one or more factors, such as one or more characteristics about the agricultural field, such as a size, shape and/or condition of the agricultural field, one or more aspects about the robotic systems 12(1)-12(n), such as an available number, an available performance range, or types and/or capabilities of available tool(s) 51 on each of the robotic systems 12(1)-12(n), and one or more task performance parameters, such as a completion time limit threshold, a cost threshold, and/or designated completion objective by way of example only. By way of example, when tessellating the electronic field map of the agricultural field for persistent scouting, the management control computing device 80 at the edge station 14 may determine to allocate a certain number of the robotic systems 12(1)-12(n) with the same types of sensors to ensure quicker coverage to meet a time limit threshold or a certain number of robotic systems 12(1)-12(n) with the different types of sensors as the tools 51 controlled to position the sensors to ensure an overlap of the imaged areas to collect multi-modal datasets. In other examples, the robotics systems 12(1)-12(n) may be directed to navigate in a manner so that the imaging sensors, such as LIDAR systems 42-44 and/or camera(s) overlap to provide enhanced detail to identify aspects and/or issues to facilitate generation of navigation and other control instructions for the robotic systems 12(1)-12(n) to effectively complete the agricultural task(s) in a manner that satisfies one or more set or otherwise stored parameters or other goals.

In step 515, the management control computing device 80 at the edge station 14 may transmit navigation instructions to the robotic management computing device 60 in each of the robotic systems 12(1)-12(n) to manage the scouting based on the tessellation of the electronic field map. In this example, each of the robotic management computing device 60 in each of the robotic systems 12(1)-12(n) may begin the execution of the navigation instructions and may transmit back captured scouting data, such as images from one or more of the LIDAR systems 42 and/or 44 and camera 46 as well as sensor data from the IMU 48 and encoders 50 to the management control computing device 80 at the edge station 14 to provide the updated scouting data and/or to dynamically adjust the navigation instructions based on identified condition(s) in the agricultural field, although the scouting data may be transmitted to other locations, such as the cloud computing system 19, and may be used for other purposes. Further, in other examples of this technology the robotic systems 12(1)-12(n) may autonomously navigate based on this obtained tessellated electronic map received from the management control computing device 80 at the edge station 14 and fused imaging data obtained from two or more LIDAR systems 42-44 or camera(s) 46 during navigation for the selected agricultural task.

In step 520, in this example the robotic management computing device 60 in one or more or each of the robotic systems 12(1)-12(n) may monitor to determine if any issue is identified during the scouting, such as an issue with one or more of the LIDAR systems 42 and 44 or the camera 46, an issue with the robotic driving system 20, or other error indication from one of the robotic systems 12(1)-12(n) by way of example, although other manners for identifying an issue may be used. By way of example, the management control computing device 80 at the edge station 14 may determine if any of the robotic systems 12(1)-12(n) encounter any issues in the robotic systems 12(1)-12(n) or with navigation in the agricultural field during the drop-off scouting. By way of another example, the management control computing device 80 at the edge station 14 may monitor each of the robotic systems 12(1)-12(n) to identify an issue with the progress of one or more of the robotic systems 12(1)-12(n) in obtaining and/or providing scouting data and/or an operational error indication or condition with one of the robotic systems 12(1)-12(n).

In this example, if in step 520 the robotic management computing device 60 in one or more of the robotic systems 12(1)-12(n) determines an issue is identified during the scouting, then the Yes branch is taken to step 525. In step 525, in this example the management control computing device 80 at the edge station 14 may receive a transmission regarding the identified issue from the robotic management computing device 60 in one or more of the robotic systems 12(1)-12(n) which identified the issue.

In step 530, the management control computing device 80 at the edge station 14 may adjust or provide an updated designation in the electronic field map when the identified issue relates to one or more parts of the agricultural field, such as a condition of the agricultural field or a new obstacle in the agricultural field by way of example only. In other examples, when the identified issue relates to one or more of the robotic systems 12(1)-12(n), then one or more of the robotic systems 12(1)-12(n), the edge station 14, and/or the cloud computing system 19 may dynamically reconfigure the navigation and other control instructions to each of the other robotic systems 12(1)-12(n) to complete the agricultural task in a manner that still satisfies the one or more task performance parameters. In yet other examples, when the identified issue would prohibit satisfaction of one or more the task performance parameters, then then the one or more of the robotic systems 12(1)-12(n), the edge station 14, and/or the cloud computing system 19 may dynamically reconfigure the navigation and other control instructions to each of the other robotic systems 12(1)-12(n) to complete the agricultural task in a manner determined to satisfy a highest number of the other task performance parameters.

In step 535, in this example when the identified issue relates to one or more of the robotic systems 12(1)-12(n), then the management control computing device 80 in the edge station 14 may update the status of the one or more of the robotic systems 12(1)-12(n) in the cloud computing system 19 and/or provide other notification, such as an electronic notification of the issue to a designated operator computing device by way of example only.

In step 540, in this example the management control computing device 80 in the edge station 14 may determine if the issue is repairable at a maintenance barn or other repair location not shown based on the notification of the issue which may include other error data about the particular issue. If in step 540, the management control computing device 80 in the edge station 14 determines the issue is not repairable at a maintenance barn or other repair location, then the No branch is taken to step 545 where an electronic transmission is generated by the management control computing device 80 in the edge station 14 and sent to a computing device associated with a designated supervisor or other operator.

If in step 540, the management control computing device 80 in the edge station 14 determines the issue is repairable at a maintenance barn, then the Yes branch is taken to step 550. In step 550, the management control computing device 80 in the edge station 14 provides control and navigation instructions to the robotic management computing device 60 in one or more of the robotic systems 12(1)-12(n) with the identified issue to return to the maintenance barn or other repair location.

In step 555, the management control computing device 80 in the edge station 14 may transmit data about the issue with the one or more of the robotic systems 12(1)-12(n) to the maintenance barn or other repair location where the repair can be completed and the repaired one or more of the robotic systems 12(1)-12(n) can return to step 500 to rejoin the persistent scouting. Meanwhile, the management control computing device 80 in the edge station 14 may dynamically reconfigure the navigation and control instructions back to the other one or more of the robotic systems 12(1)-12(n) without an identified issue to control them in a manner to complete the agricultural task. By way of example, the management control computing device 80 in the edge station 14 may determine how long the one or more of the robotic systems 12(1)-12(n) with the identified issue is unavailable and then may dynamically reconfigure the navigation and control instructions back to the other one or more of the robotic systems 12(1)-12(n) for part or the entire duration of the remaining completion of the agricultural task.

Figure 6:
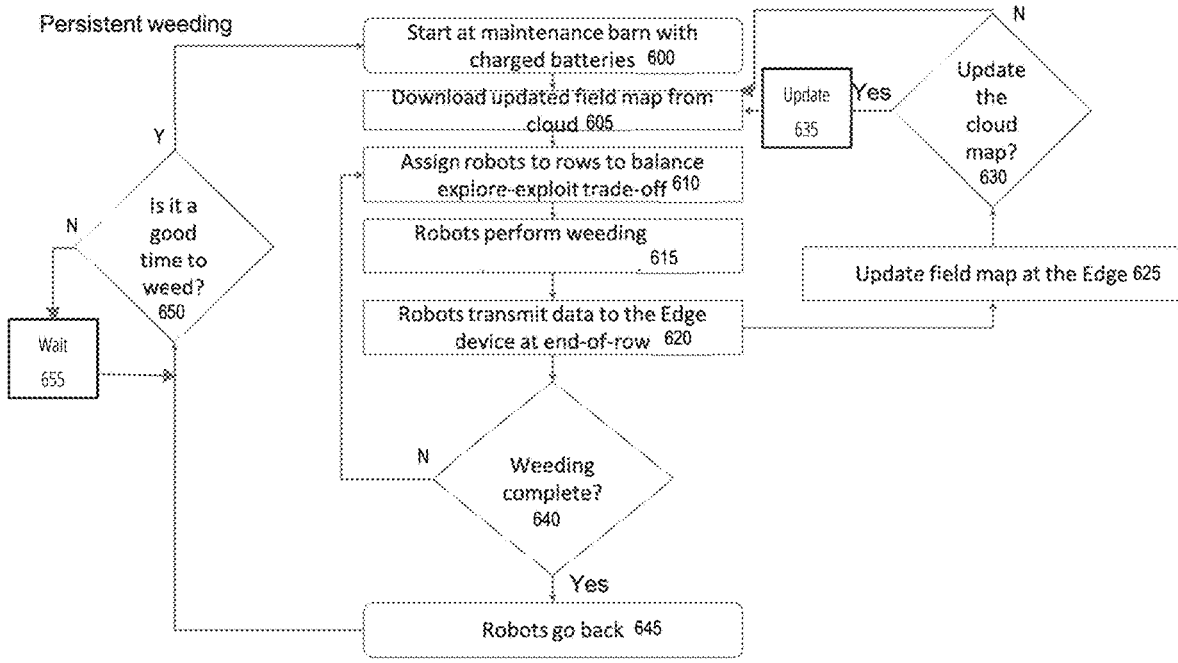
FIG. 6 is a flowchart of an example of a method for managing a coordinated autonomous teams of under-canopy robotic systems for persistent weeding of an agricultural field.

Referring to FIG. 6, an example of a method for managing a coordinated autonomous teams of under-canopy robotic systems to perform persistent weeding of an agricultural field is illustrated. In this example, in step 600 a team of robotic systems 12(1)-12(n) stationed at or adjacent to the agricultural field in a storage barn or other storage location may be engaged to perform persistent weeding, although as illustrated and described by way of the other examples herein other types and/or numbers of agricultural tasks can be completed. Additionally, in this example, each of the steps is managed by the management control computing device 80 at the edge station 14, although in other examples one or more of these steps may be managed by one or more of the robotic management computing devices 60 in the team of robotic systems 12(1)-12(n) and/or the cloud computing system 19.

In step 605, the management control computing device 80 at the edge station 14 may receive or otherwise search for and obtain an electronic field map of the agricultural field from the cloud computing system 19, although the electronic field map can be obtained from other sources and in other manners.

In step 610, the management control computing device 80 at the edge station 14 may obtain data on locations and types of current weeds in the agricultural field and then with the obtained electronic field map may determine optimized controls and navigation instructions for persistent weeding, such as targeting one or more of the robotics systems 12(1)-12(n) in adjacent and/or overlapping rows to satisfy one or more performance parameters set for this agricultural task by way of example. The data on locations and types of current weeds in the agricultural field may be obtained by the management control computing device 80 at the edge station 14 from analyzing image or other data on weeds collected the robotic systems 12(1)-12(n) obtained during drop-off scouting or persistent scouting as illustrated in FIGS. 4 and 5 by way of example.

In step 615, the management control computing device 80 at the edge station 14 may provide the determined control and navigation instructions for persistent weeding to the robotic management computing device 60 in each of the robotic systems 12(1)-12(n). The robotic management an computing device 60 in each of the robotic systems 12(1)-12(n) may process the determined control and navigation instructions for persistent weeding and then based on captured imaging data from one or more of the LIDAR systems 42 and 44 and camera 46 may with the automated weeding system 51 perform the weeding in the agricultural field in an optimized manner, although other manners for engaging the robotic systems 12(1)-12(n) to engage in persistent weeding may be used.

In step 620, the management control computing device 80 at the edge station 14 may receive data, such as captured image data about the agricultural field and/or the status of the persistent weeding in the agricultural field by way of example, from the robotic management computing device 60 in each of the robotic systems 12(1)-12(n).

In step 625, the management control computing device 80 at the edge station 14 may update the electronic field map with the received data, such as captured image data about the agricultural field and/or the status of the persistent weeding in the agricultural field by way of example.

In step 630, the management control computing device 80 at the edge station 14 may determine whether the electronic field map in the cloud computing system 19 should be updated. If the management control computing device 80 at the edge station 14 determines an update is not needed, then the No branch is taken back to step 605 as described earlier. If the management control computing device 80 at the edge station 14 determines an update is needed, then the Yes branch is taken to step 635. In step 635, the management control computing device 80 at the edge station 14 may update the stored electronic field map in the cloud computing system 19, although the map may be stored in other locations.

In step 640, the management control computing device 80 at the edge station 14 may determine whether the weeding in the agricultural field has been successfully completed based on the received status data, although other manners for determining when the weeding has been completed can be used. If in step 640 the management control computing device 80 at the edge station 14 determines the weeding in the agricultural field has not been successfully completed, then the No branch is taken back to 610 as described earlier.

If in step 640 the management control computing device 80 at the edge station 14 determines the weeding in the agricultural field has been successfully completed, then the Yes branch is taken to step 645. In step 645 the management control computing device 80 at the edge station 14 may transmit control and navigation instructions to robotic management computing device 60 in the robotic systems 12(1)-12(n) to return to the storage barn or other storage location.

In step 650, the management control computing device 80 at the edge station 14 may determine when to reengage the robotic systems 12(1)-12(n) for persistent weeding based on one or more factors, such as expiration of a set time period or identification of one or more types of weeds and/or stages of weed growth in the agricultural field from scouting that are above a set threshold by way of example. If in step 650 the management control computing device 80 at the edge station 14 determines not to reengage the robotic systems 12(1)-12(n) for persistent weeding, then the No branch is taken to step 655 where the management control computing device 80 at the edge station 14 may wait a set period of time or until some other imitating trigger is identified and then returns to step 650. If in step 650 the management control computing device 80 at the edge station 14 determines to reengage the robotic systems 12(1)-12(n) for persistent weeding, then the Yes branch is taken back to step 600 as described earlier.

Figure 7:
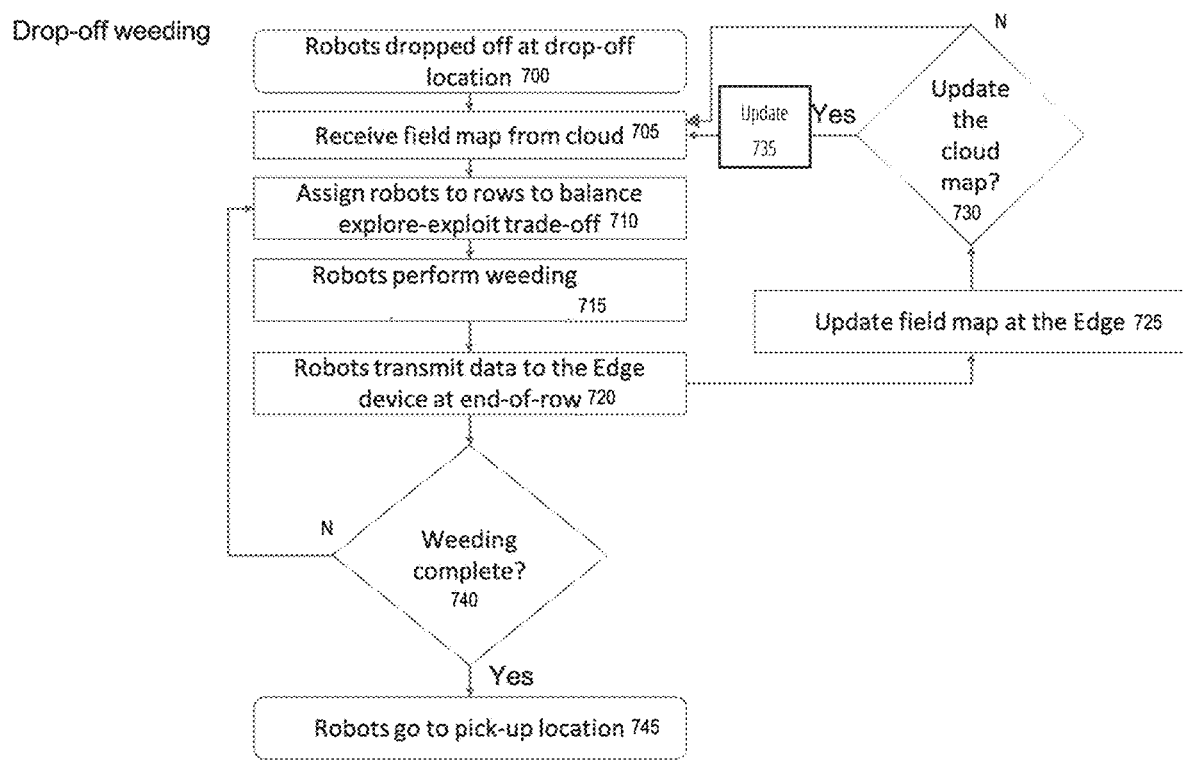
FIG. 7 is a flowchart of an example of a method for managing a coordinated autonomous teams of under-canopy robotic systems for drop off weeding.

Referring to FIG. 7, an example of a method for managing a coordinated autonomous teams of under-canopy robotic systems for drop-off weeding of an agricultural field is illustrated. In this example, in step 700 a team of robotic systems 12(1)-12(n) may be delivered to the agricultural field to perform drop-off weeding, although as illustrated and described by way of the other examples herein other types and/or numbers of agricultural tasks can be completed. Additionally, in this example, each of the steps is managed by the management control computing device 80 at the edge station 14, although in other examples one or more of these steps may be managed by one or more of the robotic management computing devices 60 in the team of robotic systems 12(1)-12(n) and/or the cloud computing system 19.

In step 705, the management control computing device 80 at the edge station 14 may receive or otherwise search for and obtain an electronic field map of the agricultural field from the cloud computing system 19, although the electronic field map can be obtained from other sources and in other manners.

In step 710, the management control computing device 80 at the edge station 14 may obtain data on locations and types of current weeds in the agricultural field and then with the obtained electronic field map may determine optimized controls and navigation instructions for drop-off weeding, such as targeting one or more of the robotics systems 12(1)-12(n) in adjacent and/or overlapping rows by way of example. The data on locations and types of current weeds in the agricultural field may be obtained by the management control computing device 80 at the edge station 14 analyzing image or other data on weeds collected the robotic systems 12(1)-12(n) obtained during drop-off or persistent scouting as illustrated in FIGS. 4 and 5.

In step 715, the management control computing device 80 at the edge station 14 may provide the determined control and navigation instructions for drop-off weeding to the robotic management computing device 60 in each of the robotic systems 12(1)-12(n). The robotic management an computing device 60 in each of the robotic systems 12(1)-12(n) may process the determined control and navigation instructions for drop-off weeding and then based on captured imaging data from one or more of the LIDAR systems 42 and 44 and camera 46 may with the automated weeding system 51 perform the weeding in the agricultural field, although other manners for engaging the robotic systems 12(1)-12(n) to engage in drop-off weeding may be used.

In step 720, the management control computing device 80 at the edge station 14 may receive data, such as captured image data about the agricultural field and/or the status of the drop-off weeding in the agricultural field by way of example, from the robotic management computing device 60 in each of the robotic systems 12(1)-12(n).

In step 725, the management control computing device 80 at the edge station 14 may update the electronic field map with the received data, such as captured image data about the agricultural field and/or the status of the drop-off weeding in the agricultural field by way of example.

In step 730, the management control computing device 80 at the edge station 14 may determine whether the electronic field map in the cloud computing system 19 should be updated. If the management control computing device 80 at the edge station 14 determines an update is not needed, then the No branch is taken back to step 705 as described earlier. If the management control computing device 80 at the edge station 14 determines an update is needed, then the Yes branch is taken to step 735. In step 735, the management control computing device 80 at the edge station 14 may update the stored electronic field map in the cloud computing system 19.

In step 740, the management control computing device 80 at the edge station 14 may determine whether the weeding in the agricultural field has been successfully completed based on the received status data, although other manners for determining when the weeding has been completed can be used. If in step 740 the management control computing device 80 at the edge station 14 determines the weeding in the agricultural field has not been successfully completed, then the No branch is taken back to step 710 as described earlier.

If in step 740 the management control computing device 80 at the edge station 14 determines the weeding in the agricultural field has been successfully completed, then the Yes branch is taken to step 745. In step 745 the management control computing device 80 at the edge station 14 may transmit control and navigation instructions to robotic management computing device 60 in the robotic systems 12(1)-12(n) to return to a location for pick-up.

Figure 8:
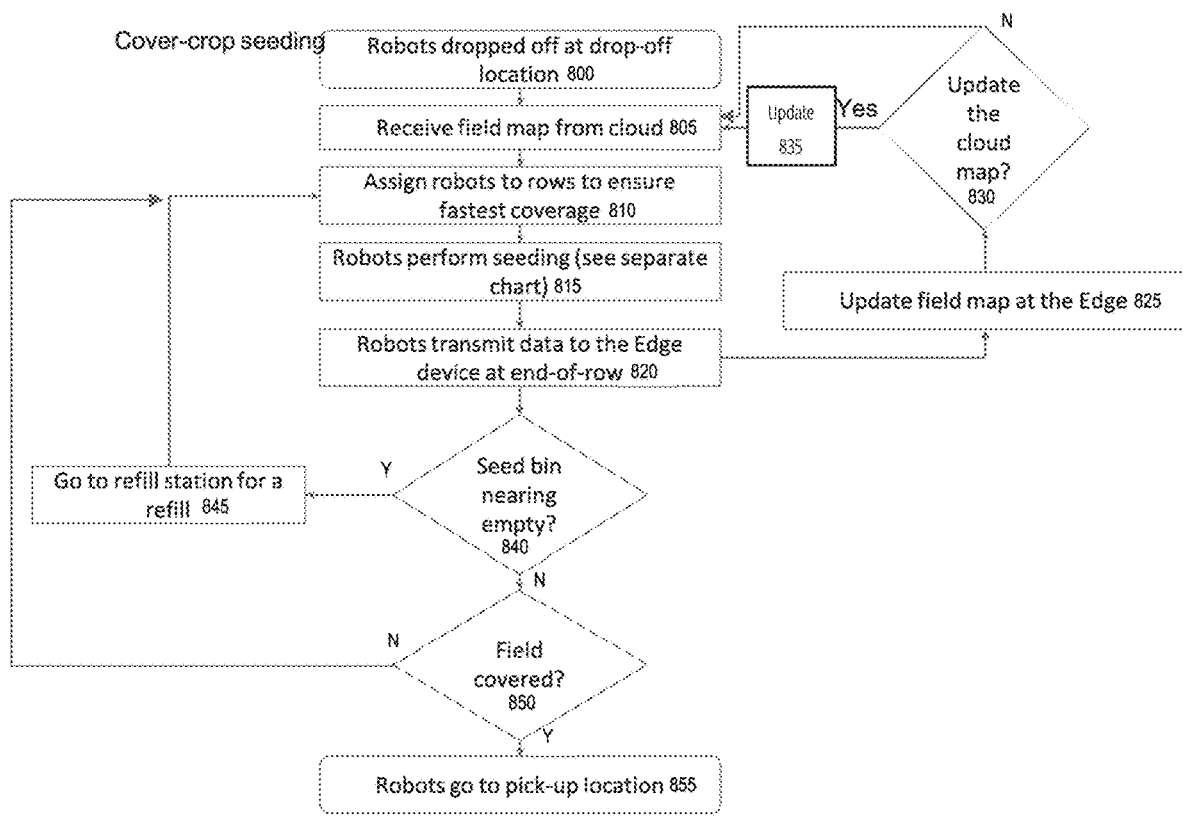
FIG. 8 is a flowchart of an example of a method for managing a coordinated autonomous teams of under-canopy robotic systems for cover crop seeding of an agricultural field.

Referring to FIG. 8, an example of a method for managing a coordinated autonomous teams of under-canopy robotic systems to perform cover crop seeding of an agricultural field is illustrated. In this example, in step 800 a team of robotic systems 12(1)-12(n) may be delivered to the agricultural field to perform scouting, although as illustrated and described by way of the other examples herein other types and/or numbers of agricultural tasks can be completed. Additionally, in this example, each of the steps is managed by the management control computing device 80 at the edge station 14, although in other examples one or more of these steps may be managed by one or more of the robotic management computing devices 60 in the team of robotic systems 12(1)-12(n) and/or the cloud computing system 19.

In step 805, the management control computing device 80 at the edge station 14 may receive or otherwise search for and obtain an electronic field map of the agricultural field to manage planning for performance of one or more agricultural tasks.

In step 810, the management control computing device 80 at the edge station 14 may determine optimized controls and navigation instructions for the cover crop seeding based on the obtained electronic field map and a determined number of the robotic systems 12(1)-12(n) to assign to a team. For example, the management control computing device 80 at the edge station 14 may determine optimized controls and navigation instructions for a team of five of the robotic systems 12(1)-12(n) to perform cover crop seeding of an entire eighty acre field (every 3rd row) in 8.71 hours when each of the of the robotic systems 12(1)-12(n) is driven at two miles per hour. In another example, if the agricultural field was only twenty acres, the management control computing device 80 at the edge station 14 may determine optimized controls and navigation instructions for the team of five of the robotic systems 12(1)-12(n) to complete the cover crop seeding in two hours. This seamless scaling up or down across field sizes based on factors, such as the number of robotic systems 12(1)-12(n) or the size of the field by way of example, is one of the advantages of the claimed technology.

In step 815, the management control computing device 80 at the edge station 14 may provide the determined control and navigation instructions for the cover crop seeding to the robotic management computing device 60 in each of the robotic systems 12(1)-12(n). The robotic management an computing device 60 in each of the robotic systems 12(1)-12(n) may process the determined control and navigation instructions for cover crop seeding and then based on captured imaging data from one or more of the LIDAR systems 42 and 44 and camera 46 may with the automated seeding mechanism 51 perform cover crop seeding in the agricultural field, although other manners for engaging the robotic systems 12(1)-12(n) to engage in seeding may be used.

In step 820, the management control computing device 80 at the edge station 14 may receive data, such as captured image data about the agricultural field and/or the status of the seeding in the agricultural field by way of example, from the robotic management computing device 60 in each of the robotic systems 12(1)-12(n).

In step 825, the management control computing device 80 at the edge station 14 may update the electronic field map with the received data, such as captured image data about the agricultural field and/or the status of the cover crop seeding in the agricultural field by way of example.

In step 830, the management control computing device 80 at the edge station 14 may determine whether the electronic field map in the cloud computing system 19 should be updated. If the management control computing device 80 at the edge station 14 determines an update is not needed, then the No branch is taken back to step 805 as described earlier. If the management control computing device 80 at the edge station 14 determines an update is needed, then the Yes branch is taken to step 835. In step 835, the management control computing device 80 at the edge station 14 may update the stored electronic field map in the cloud computing system 19.

In step 840, the management control computing device 80 at the edge station 14 may determine whether a seeding bin in any of robotic systems 12(1)-12(n) is empty or below a lower threshold amount and needs to be refilled. If in step 840 the management control computing device 80 at the edge station 14 determines a seeding bin in any of robotic systems 12(1)-12(n) needs to be refilled, then the Yes branch is taken to step 845. In step 845 the management control computing device 80 at the edge station 14 transmits control and navigation instructions to the robotic management computing device 60 in any of the robotic systems 12(1)-12(n) to return to the edge station 14 for automated refilling with seed by the maintenance system 94, although other manners for refilling can be used and then proceeds to step 810 as described earlier.

If in step 840 the management control computing device 80 at the edge station 14 determines a seeding bin in any of robotic systems 12(1)-12(n) does not need to be refilled, then the No branch to step 850. In step 850, the management control computing device 80 at the edge station 14 may determine whether the seeding in the agricultural field has been successfully completed based on the received status data, although other manners for determining when the seeding has been completed can be used. If in step 850 the management control computing device 80 at the edge station 14 determines the seeding in the agricultural field has not been successfully completed, then the No branch is taken back to step 810 as described earlier.

If in step 850 the management control computing device 80 at the edge station 14 determines the weeding in the agricultural field has been successfully completed, then the Yes branch is taken to step 855. In step 855 the management control computing device 80 at the edge station 14 may transmit control and navigation instructions to robotic management computing device 60 in the robotic systems 12(1)-12(n) to return to a location for pick-up.

Accordingly, as illustrated and described by way of the examples herein the robotic systems 12(1)-12(n) are connected to each other and to a computing node or edge station 14 of the field and/or to the cloud computing system 19 and enjoy a hierarchic command and control methodology. For example, the robotic systems 12(1)-12(n) may receive instruction from the cloud computing system 19, which the edge station 14 may reinterpret and adapt to the specifics of the agricultural field the robotic systems 12(1)-12(n) are operating in. In addition, individual robotic systems 12(1)-12(n) are able to reinterpret commands from the node at the edge station 14 and adapt it to specific conditions that the robotic systems 12(1)-12(n) are encountering. For example, the cloud computing system 19 may instruct to plant cover-crops, the edge station 14 may interpret to instruct the robotic systems 12(1)-12(n) to plant every alternate rows given that robotic systems 12(1)-12(n) are equipped with cover-crop planting systems that can cover two rows. The robotic systems 12(1)-12(n) in addition may further adapt the instructions to choose the rows that they will traverse in. This allows flexibility for the robotic systems 12(1)-12(n) to avoid a particular row that may have lodged plants that neither the edge station 14 nor the cloud computing system 19 knows about.

In addition, examples of the claimed technology are designed such that obstacles and issues faced by a single one of the robotic systems 12(1)-12(n) are used to improve the robustness and efficiency of the entire team, resulting in lower cost of operation. For example, if a single one of the robotic systems 12(1)-12(n) encounters a lodged plant in the row, not only will the one of the robotic systems 12(1)-12(n) inform the other ones of the robotic systems 12(1)-12(n) of the location of this lodged plant, but the edge system 14 will also be capable of using past data from that agricultural field, and historic models of lodging, along with wind intensity maps from the cloud computing system 19 to predict which parts of the agricultural field will be lodged, so that the robotic systems 12(1)-12(n) in the team can plan their paths to minimize down time and the potential of being stuck.

In other examples illustrating swarm intelligence obtained by the edge station from the team of the robotic systems 12(1)-12(n) is in predicting areas of the agricultural field that are likely to have a higher density of weeds, so that a mechanical weeding team or a chemical spraying team of the robotic systems 12(1)-12(n), can concentrate their efforts on parts of the agricultural field that are more likely to be affected by weeds.

All of this may be enabled via a user interface system 88 at the edge station 14 in this example that enables a farmer or other operator to command large teams of robotic systems. The user interface system 88 can be configured to focus on a single one of the of the robotic systems 12(1)-12(n) at any given time, or at a team of the robotic systems 12(1)-12(n) on a particular field (Edge scenario), or to multiple teams of the robotic systems 12(1)-12(n) on multiple fields (Cloud scenario). This user interface system 88 can be implemented as an application on interactive display for example at the edge station 14 or for example in a portable device or through the web. The user interface system 88 can use graphical interfaces as well as natural language instructions, using machine learning and other enabling technologies to translate spoken instructions, in multiple languages, to machine programs through the hierarchic control system.

Accordingly, this technology provides an interactive team of robotic systems and methods to more effectively accomplish one or more agricultural management tasks in an agricultural field. This type of coordinated team based approach with the robotic systems provides significant flexibility in scaling up or down according to agricultural field size enabling much more efficient execution of specific tasks and "scale-neutral" agriculture which is not possible with a single large equipment due to their large cost. Examples of the claimed technology may utilize a robotic command-and-control system that determines the best configuration and/or types of robotic systems to accomplish one or more agricultural tasks specific to an agricultural field. In another example when executing scouting, examples of the claimed technology can allocate multiple robot systems with the same types of sensors to ensure quicker coverage or multiple robot systems with the different types of sensors positioned to ensure an overlap of the imaged areas to collect multi-modal datasets.

Examples of this technology are able to use data from one or more robotic systems in a team to improve navigation for other ones of the robotic system in the team. Additionally, with examples of this technology from one or more robotic systems in a team can advantageously learn about executing one or more agricultural management tasks from other ones of the robotic system in the team.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   obtaining, by a computing device, an electronic map of an agricultural field;
   generating, by the computing device, one or more assignment instructions for each of a plurality of robotic systems in an assigned team for a selected agricultural task, based on the obtained electronic map, a number of the plurality of robotic systems in the assigned team, and at least one capability of each of the plurality of robotic systems in the assigned team;
   converting, by the computing device, motion data received from each of the plurality of robotic systems into one or more electrical signals, to control motion of each of the plurality of robotic systems;

managing, by the computing device, the plurality of robotic systems in the assigned team based on wireless transmission of the generated one or more assignment instructions to each of the plurality of robotic systems;

receiving, by the computing device, issue data from a first robotic system of the plurality of robotic systems, wherein the issue data is related to an operational error in the first robotic system; and updating, by the computing device, navigational instructions to control the motion of one or more other robotic systems from the plurality of robotic systems based on task performance parameters, the issue data, and the historical data of the agricultural field associated with the issue data.

2. The method as set forth in claim 1, wherein the generating the one or more assignment instructions further comprises:

tessellating, by the computing device, the obtained electronic map into sections for each of the robotic systems based on the obtained electronic map, the number of the plurality of robotic systems in the assigned team, the task performance parameters, and the at least one capability of each of the plurality of robotic systems in the assigned team, wherein the task performance parameters comprises at least one of a completion time limit threshold, a cost threshold, designated completion objective related to the selected agricultural task, and wherein the designated completion objective is a percentage of the selected agricultural task;

wherein each of the plurality of robotic systems navigates autonomously based on the tessellating and fused data obtained from two or more LIDAR systems or cameras during the selected agricultural task.

3. The method as set forth in claim 2, further comprising:

tessellating, by the computing device, the obtained electronic map into sections for each of the plurality of robotic systems based on the obtained electronic map, the number of the plurality of robotic systems in the assigned team, and the at least one capability of each of the plurality of robotic systems in the assigned team; and adjusting, by the computing device, the tessellation of the obtained electronic map based on the received issue data.

4. The method as set forth in claim 1, wherein the managing the plurality of robotic systems in the assigned team further comprises:

predictively adjusting, by the computing device, the one or more assignment instructions for the one or more other robotic systems from the plurality of robotic systems in the assigned team based on the issue data and historical data about the agricultural field associated with the issue data; and managing, by the computing device, the plurality of robotic systems in the assigned team based on the adjusted one or more assignment instructions.

5. The method as set forth in claim 1, wherein the at least one capability comprises a scouting imaging system, a sprayer, a weeding system, or a planter.

6. The method as set forth in claim 1, wherein the one or more assignment instructions further comprise navigation instructions, task performance instructions related to the at least one capability of each of the plurality of robotic systems in the assigned team, and maintenance instructions.

7. The method as set forth in claim 1, wherein the issue data is related to progress of the first robotic system in obtaining and providing scouting data and at least one of an operational error indication and condition with the first robotic system.

8. The method as set forth in claim 1, wherein managing the robotic systems in the team further comprises: monitoring the plurality of robotic systems, to identify one or more issues, based on at least one of scouting data and sensor data received from the plurality of robotic systems, and wherein the sensor data comprises data received from an Inertial Measurement Unit (IMU), and wherein the IMU is installed on each of the plurality of robotic systems.

9. The method as claimed in claim 8, wherein the sensor data comprises data corresponding to specific force, angular rate, orientation, or a combination thereof, for each of the plurality of robotic systems as measured by the IMU.

10. An agricultural management system, the system comprising:

a memory comprising programmed instructions stored thereon and one or more processors configured to be capable of executing the stored programmed instructions to:

obtain an electronic map of an agricultural field;

generate one or more assignment instructions for each of a plurality of robotic systems in an assigned team for the selected agricultural task based on the obtained electronic map, a number of the robotic systems in the team, issue data, and at least one capability of each of the robotic systems in the team;

convert motion data received from each of the plurality of robotic systems into one or more electrical signals, to control motion of each of the plurality of robotic systems;

manage the plurality of robotic systems in the assigned team, based on wireless transmission of the generated assignment instructions to the plurality of robotic systems, receive issue data from a first robotic system of the plurality of robotic systems, wherein the issue data is related to an operational error in the first robotic system; and update navigational instructions to control the motion of one or more other robotic systems from the plurality of robotic systems based on task performance parameters, the issue data, and the historical data of the agricultural field associated with the issue data.

11. The system as set forth in claim 10, wherein to generate the one or more assignment instructions, the one or more processors are further configured to be capable of executing the stored programmed instructions to:

tessellate the obtained electronic map into sections for each of the plurality of robotic systems based on the obtained electronic map, the number of the plurality of robotic systems in the assigned team, the task performance parameters, and the at least one capability of each of the plurality of robotic systems in the assigned team, wherein the task performance parameters comprises at least one of a completion time limit threshold, a cost threshold, designated completion objective related to the selected agricultural task, and wherein the designated completion objective is a percentage of the selected agricultural task;

wherein each of the plurality of robotic systems navigates autonomously based on the tessellating and obtained fused data from two or more LIDAR systems or cameras during the selected agricultural task.

12. The system as set forth in claim 10, wherein the one or more processors are further configured to be capable of executing the stored programmed instructions to:
    tessellate the obtained electronic map into sections for each of the plurality of robotic systems based on the obtained electronic map, the number of the plurality of robotic systems in the assigned team, and the at least one capability of each of the plurality of robotic systems in the assigned team; and
    adjust the tessellation of the obtained electronic map based on the received issue data.

13. The system as set forth in claim 10, wherein to manage the plurality of robotic systems in the assigned team, the one or more processors are further configured to be capable of executing the stored programmed instructions to:
    predictively adjust the one or more assignment instructions for the one or more other robotic systems from the plurality of robotic systems in the assigned team based on the issue data and historical data about the agricultural field associated with the issue data; and
    manage the plurality of robotic systems in the assigned team based on the adjusted one or more assignment instructions.

14. The system as set forth in claim 10, wherein the at least one capability comprises a scouting imaging system, a sprayer, a weeding system, or a planter.

15. The system as set forth in claim 10, wherein the one or more assignment instructions further comprise navigation instructions, task performance instructions related to the at least one capability of each of the plurality of robotic systems in the assigned team, and maintenance instructions.

16. The non-transitory computer readable medium as set forth in claim 14, wherein generate the one or more assignment instructions, the executable code when executed by the one or more processors further causes the one or more processors to:
    tessellate the obtained electronic map into sections for each of the plurality of robotic systems based on the obtained electronic map, the number of the plurality of robotic systems in the assigned team, the task performance parameters, and the at least one capability of each of the plurality of robotic systems in the assigned team, wherein the task performance parameters comprises at least one of a completion time limit threshold, a cost threshold, designated completion objective related to the selected agricultural task, and wherein the designated completion objective is a percentage of the selected agricultural task;
    wherein each of the plurality of robotic systems navigates autonomously based on the tessellating and fused data obtained from two or more LIDAR systems or cameras during the selected agricultural task.

17. The non-transitory computer readable medium as set forth in claim 15, wherein the one or more processors are further configured to be capable of executing the stored programmed instructions to:
    tessellate the obtained electronic map into sections for each of the plurality of robotic systems based on the obtained electronic map, the number of the plurality of robotic systems in the assigned team, and the at least one capability of each of the plurality of robotic systems in the assigned team; and
    adjust the tessellation of the obtained electronic map based on the issue data.

18. The non-transitory computer readable medium as set forth in claim 14, wherein to manage the plurality of robotic systems in the assigned team, the executable code when executed by the one or more processors further causes the one or more processors to:
    predictively adjust the one or more assignment instructions for the one or more other robotic systems from the plurality of robotic systems in the assigned team, based on the issue data and historical data about the agricultural field associated with the issue data; and
    manage the robotic systems in the team based on the adjusted one or more assignment instructions.

19. The non-transitory computer readable medium as set forth in claim 14, wherein the at least one capability comprises a scouting imaging system, a sprayer, a weeding system, or a planter.

20. The non-transitory computer readable medium as set forth in claim 14, wherein the one or more assignment instructions further comprise navigation instructions, task performance instructions related to the at least one capability of each of the plurality of robotic systems in the assigned team, and maintenance instructions.

21. A non-transitory computer readable medium having stored thereon instructions comprising executable code which when executed by one or more processors, causes the one or more processors to:
    obtain an electronic map of an agricultural field;
    generate one or more assignment instructions for each of a plurality of robotic systems in an assigned team for the selected agricultural task based on the obtained electronic map, a number of the plurality of robotic systems in the assigned team, and at least one capability of each of the plurality of robotic systems in the assigned team;
    convert motion data received from each of the plurality of robotic systems into one or more electrical signals, to control motion of each of the plurality of robotic systems;
    manage the plurality of robotic systems in the assigned team based on wireless transmission of the generated assignment instructions to the plurality of robotic systems,
    receive issue data from a first robotic system of the plurality of robotic systems, wherein the issue data is related to an operational error in the first robotic system; and
    update navigational instructions to control the motion of one or more other robotic systems from the plurality of robotic systems based on task performance parameters, the issue data, and the historical data of the agricultural field associated with the issue data.

* * * * *

UNITED STATES PATENT AND TRADEMARK OFFICE
CERTIFICATE OF CORRECTION

PATENT NO. : 12,001,221 B2
APPLICATION NO. : 17/219471
DATED : June 4, 2024
INVENTOR(S) : Girish Chowdhary et al.

It is certified that error appears in the above-identified patent and that said Letters Patent is hereby corrected as shown below:

In the Claims

Claim 16 Column 25 Line 34 should read "forth in claim 14, wherein for the generate the one or more assign-"

Signed and Sealed this
Tenth Day of September, 2024

Katherine Kelly Vidal
Director of the United States Patent and Trademark Office